(12) United States Patent
Lutes

(10) Patent No.: US 10,174,511 B2
(45) Date of Patent: Jan. 8, 2019

(54) SCREED HOOK APPARATUS

(71) Applicant: Stego Industries, LLC, San Clemente, CA (US)

(72) Inventor: James Steven Lutes, Sacramento, CA (US)

(73) Assignee: Stego Industries, LLC, San Clemente, CA (US)

(*) Notice: Subject to any disclaimer, the term of this patent is extended or adjusted under 35 U.S.C. 154(b) by 0 days.

(21) Appl. No.: 15/267,112

(22) Filed: Sep. 15, 2016

(65) Prior Publication Data

US 2018/0073256 A1 Mar. 15, 2018

(51) Int. Cl.
*A47B 96/06* (2006.01)
*E04F 21/24* (2006.01)
*F16M 13/02* (2006.01)
*F16B 7/22* (2006.01)
*F16B 7/18* (2006.01)

(52) U.S. Cl.
CPC .............. *E04F 21/241* (2013.01); *F16B 7/18* (2013.01); *F16B 7/22* (2013.01); *F16M 13/022* (2013.01)

(58) Field of Classification Search
CPC . F16M 13/022; F16B 7/18; F16B 7/22; F16L 3/24; B05B 1/00; B25B 5/10; B25B 1/10
USPC ........................ 248/214, 231.71, 226.11, 327
See application file for complete search history.

(56) References Cited

U.S. PATENT DOCUMENTS

| | | | | |
|---|---|---|---|---|
| 3,321,161 | A * | 5/1967 | Hirt ........................... | F16L 3/24 248/327 |
| 6,296,241 | B1 * | 10/2001 | Harrison ................... | B25B 5/10 269/172 |
| D470,400 | S * | 2/2003 | Fraser ........................... | D8/396 |
| D748,183 | S * | 1/2016 | Polito .......................... | D16/242 |
| 2007/0262177 | A1 * | 11/2007 | Chung ...................... | B05B 1/00 239/600 |
| 2013/0300048 | A1 * | 11/2013 | Chen ......................... | B25B 1/10 269/246 |
| 2016/0138280 | A1 * | 5/2016 | Lutes .................... | E04F 21/241 33/533 |

OTHER PUBLICATIONS

"Needle Pinch Valve" retrieved on Sep. 15, 2016 at <<https://flow-rite.com/fluid-handling/needle-pinch-valves>>, Flow-Rite Controls USA, 3 pages.

* cited by examiner

*Primary Examiner* — Todd M Epps
(74) *Attorney, Agent, or Firm* — Lee & Hayes, P.C.

(57) ABSTRACT

A screed hook apparatus includes a tubular collar having an opening through a sidewall thereof. A tubular retainer member is aligned with the opening on the collar and extends away from an outer surface of the collar. The retainer member has a threaded internal wall surface. The apparatus also includes an arm forming a hook shape. The arm has a first portion extending away from the collar and a second portion extending transverse to a direction of extension of the first portion such that a surface of the second portion of the arm faces the sidewall of the collar. A set screw has a threaded portion to engage the threaded internal wall surface of the retainer member, and a handle is attached to the set screw.

19 Claims, 3 Drawing Sheets

SCREED HOOK APPARATUS

BACKGROUND

Screeding is the act of striking off freshly placed concrete with a straight edge to a set or desired elevation while the concrete is still in a plastic state. As the straight edge is pulled across the top of the concrete, excess concrete is pulled out of the way to make a level surface, and places that are too low have concrete added to them until the grade is uniform. Once a bay or strip of the concrete slab is screeded, the adjacent bay or strip is poured and the grade for the newly poured concrete may be based, in part, on the previously completed bay or strip.

In some instances, one or more fixed height rails or beams may be used as a frame or fixed height screed guide in the screeding process. These rails may be supported using screed hooks that slide over stakes or rebar. Currently, screed hooks are often made of metal and have a set screw extending from the body opposite the hook arm. The set screw is tightened using a handheld tool to set the height of the hook with respect to the stake and the surface in which the stake is placed.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

Figure 1:
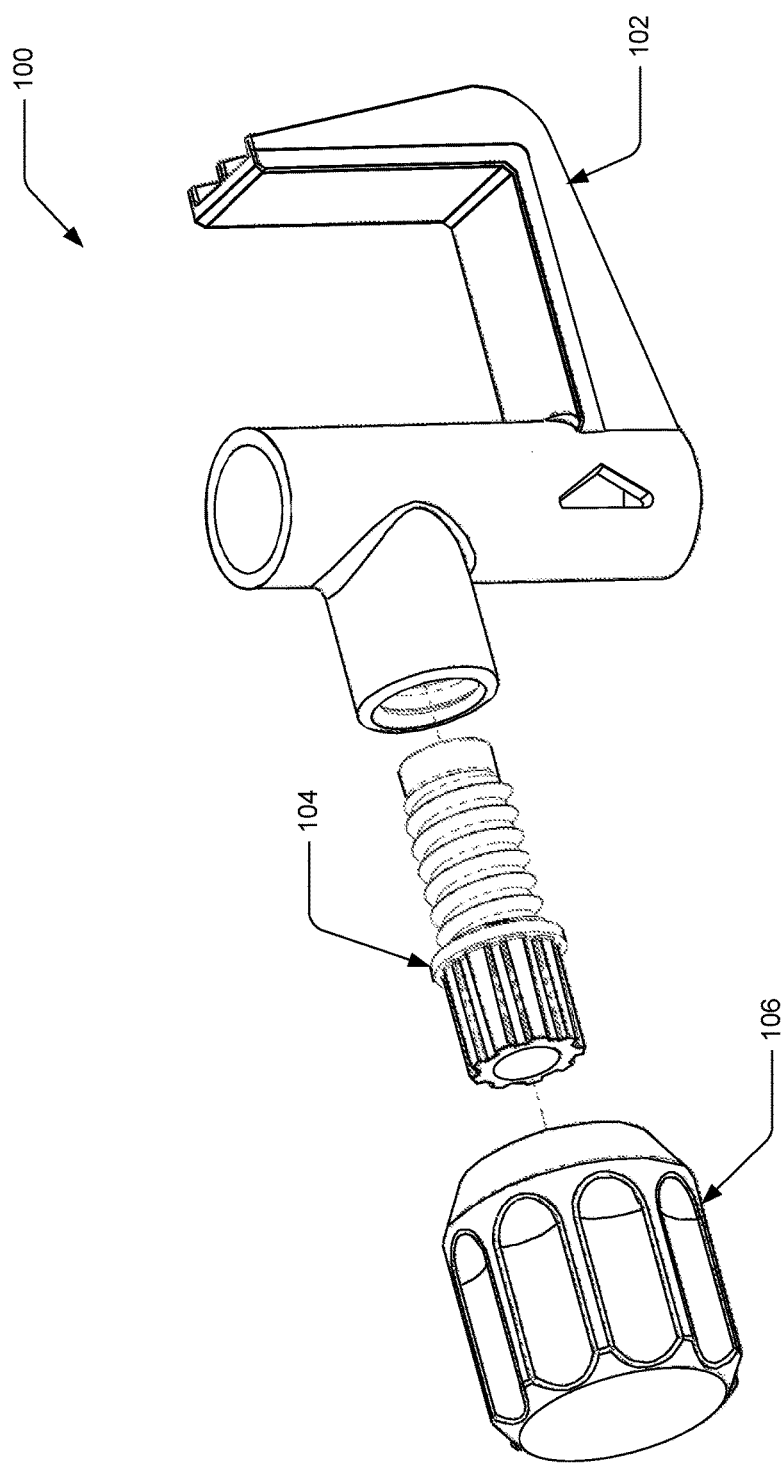
FIG. 1 illustrates an exploded view of the screed hook apparatus according to an embodiment of the instant application.

This disclosure is directed to an improved screed hook that mitigates some of the challenges faced with conventional screed hooks. Conventional screed hooks normally include a metal L-shaped hook, where a hole with a vertical axis is formed in the free end of the lateral portion of the L-shaped hook to form a collar that can accommodate a concrete stake therein. Further, a narrow metal set screw screws directly into the outer wall of the collar, extending through the wall into the hole to set the hook in place against a stake. As such, the collar is essentially the same thickness as the lateral portion of the L-shaped hook, and the set screw is aligned with the direction of extension of the lateral portion of the L-shaped hook. Furthermore, the set screw is a narrow screw that rotates and/or tightens down against the stake via a separate tool, where the tool is used to add torque via a longer moment arm from the point of applied rotational force. While it may be possible to rotate the set screw of a conventional screed hook by hand, such an action generally would be done with gloves removed and only the force capable of being exerted by pinching and twisting the end of the narrow set screw between a finger and thumb.

In some instances, the screed hook described herein may include an elongated collar that extends beyond the height/thickness of the lateral portion of the hook. As such, the vertical portion of the hook faces an external sidewall of the collar. Moreover, the set screw may then be located at a position on the collar that is spaced apart from the lateral portion of the hook, on which a rail would rest when used. By locating the set screw at a position on the collar that is spaced apart from the lateral portion of the hook, the frictional force for holding the screed hook in place on the stake may increase. Specifically, a laterally directed force is exerted at the pinch point between the set screw and the stake. Further, when a rail is set in the hook, the weight of the rail creates a downwardly directed force as it pushes the collar downward. However, in an embodiment of the instant application, since the downward force from the rail is spaced axially along the collar from the laterally directed force of the pinch point on the stake, the frictional contact force between the inner wall surface of the collar and the external surface of the stake may be increased.

In some instances, a sight window in the collar (e.g., an aperture through a sidewall of the collar) may be included to allow a user to align the hook with a grade mark on the stake on which the screed hook is being placed. The sight window may have any shape desirable. When using a shape having a vertex, the vertex of the shape of the sight window may be oriented so as to function as pointing to the level of the grade or the top of slab mark on the stake where the rail is resting in the hook.

Additionally, and/or alternatively, a screed hook may include a handle connected to the set screw. The handle may be fixedly attached to the set screw, and/or removably attached. For example, to reduce the risk of losing or misplacing the handle, the handle may be fixedly attached to the end of the set screw. The handle may be cup-shaped and the set screw may attach to the inner surface of the closed end of the handle. Moreover, the collar may further include a tubular retaining member extending from the sidewall of the collar. As the set screw engages in the retaining member, the threaded coil of the set screw is protected from concrete mortar and other environmental factors first by the external wall surface of the retaining member, and second by the external wall surface of the handle as it surrounds the retaining member. Thus, the performance of the set screw may be increased both in ease of use and functionality.

Furthermore, inasmuch as the handle is attached to the set screw, the handle may eliminate the need for a separate tool or removal of protective work gloves to manipulate the set screw. In particular, the external dimensions of the handle may be sized to provide additional torque force when the handle is rotated by grasping manually between the fingers and the palm of the hand, even when the hand of the user is wearing a glove. As such, the speed of placement of the screed hooks of the instant application may be increased compared to conventional screed hooks. For example, in an example embodiment where the external shape of the handle is generally round, a large external diameter of the handle compared to the small diameter of the set screw may facilitate improved manipulation of the set screw.

Embodiments of the screed hook of the instant application may be formed from any suitable materials, including but not limited to metal and plastic, such as polypropylene and ABS. In some instances, the different components of the screed hook may be formed from different materials. For example, the handle may be formed separately and of different materials from the set screw, and/or the retaining member, the collar, or the hook member, and vice versa.

Regardless of the choice of material, in some instances, the hook may include one or more ribs to structurally reinforce the hook. The one or more ribs may extend along at least a portion of a surface of the lateral and/or vertical portions of the hook. In some instances, the one or more ribs may extend continuously along a back surface of the hook from the collar to an end of the vertical portion of the hook.

Note, for the purposes of this application, the term "vertical," with respect to the hook member, indicates that portion of the hook member which extends in a direction transverse to the direction of extension of the lateral portion of the hook member, which is intended to be described as extending in a direction that is transverse to the direction of extension of the elongation direction of the collar. In other words, the vertical portion of the hook member may be parallel, or substantially parallel to an axis of the collar, while the lateral portion of the hook member extends orthogonal, substantially orthogonal, or at least transverse to both the vertical portion of the hook member and the axis of the collar.

Illustrative Embodiments of a Screed Hook Apparatus

Specifically, FIG. 1 illustrates an exploded view of components of a screed hook apparatus 100. In overview, screed apparatus 100 may include a hook member 102, a set screw 104, and a handle 106. Although depicted as a separate component for the purpose of a detailed view, handle 106 may be fixedly attached to set screw 104 as indicated above.

Figure 2:
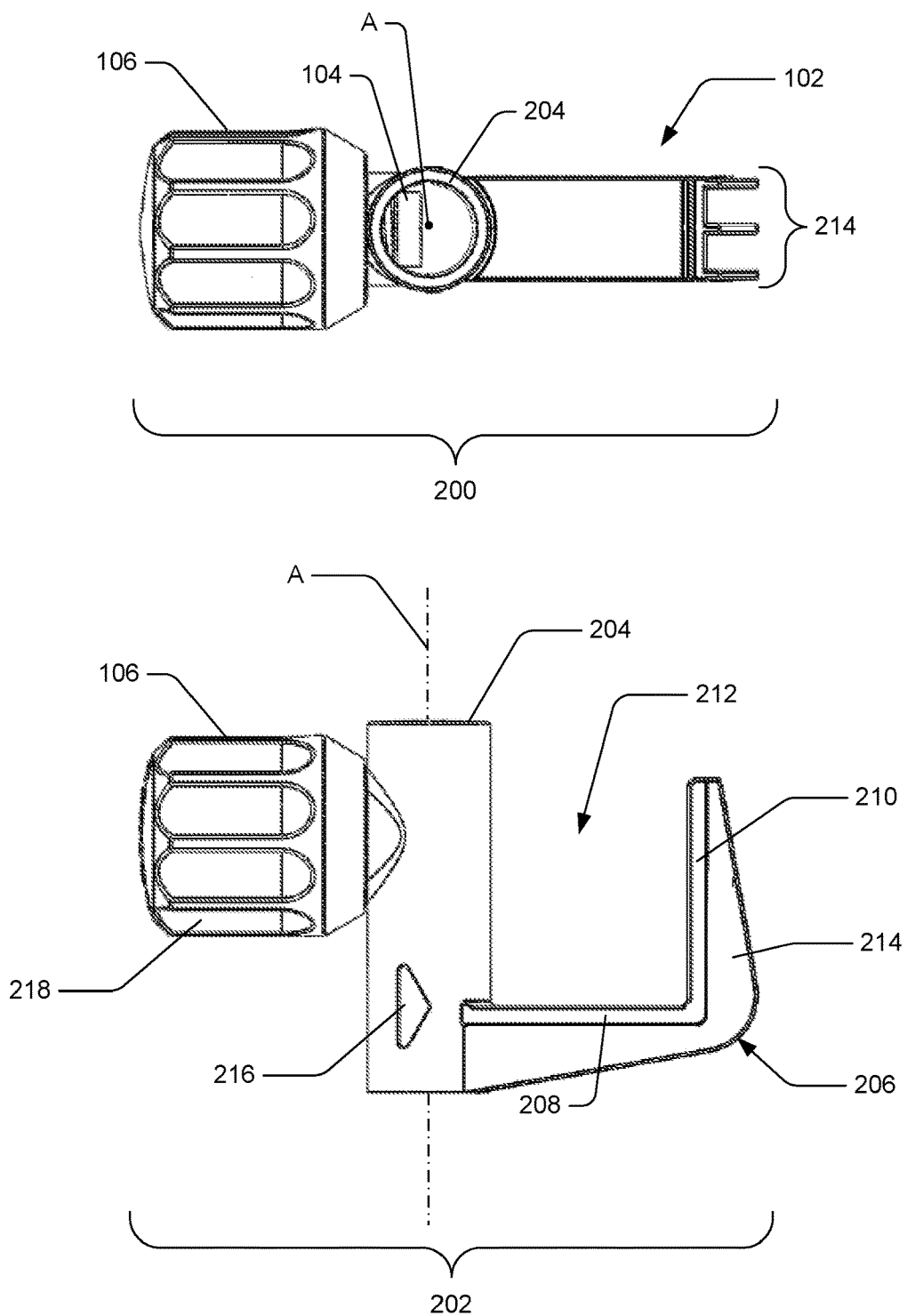
FIG. 2 illustrates top and side views of the screed hook apparatus according to an embodiment of the instant application.

In FIG. 2, a top view 200 of the screed hook apparatus 100 is depicted, as well as a side view 202 of the screed hook apparatus 100. Hook member 102 may include a collar 204 and a hook 206. Consistent with the discussion above, as depicted, collar 204 may be elongated such that handle 106 (and attached set screw 104) may be attached to collar 204 via the set screw 104 at a first axial position of the collar 204, and hook 206 may be attached to collar 204 at a second axial position of the collar 204 that is distinct from the first axial position. However, in some instances (not illustrated), the hook and the set screw may extend from the collar at a plane having a same axial location. Furthermore, in some instances (also not illustrated), the collar may be the same or approximately the same height as the lateral portion of the hook.

Additionally, and/or alternatively, hook 206 may be discussed as including a lateral portion 208 (or a rail rest portion) and a vertical portion 210 (or a rail side brace portion). Notably, the vertical portion 210 may face the elongated collar 204, as depicted, extending substantially parallel thereto. As such, a space 212 (or gap) may be formed between the vertical portion 210 of the hook 206 and collar 204, in which a rail may be placed to rest on the lateral portion 208. Note, in an embodiment with a shortened collar, the vertical portion of the hook may not face the collar.

In some instances, hook 206 may include one or more ribs 214. As shown, ribs 214 may extend in respective planes along a back surface of hook 206 such that the plane or planes are parallel, substantially parallel, or coplanar with the axis (A) of collar 206. For example, cost savings may be possible by producing plastic screed hooks. However, inasmuch as many plastic materials are lighter than metal, and may suffer from decreased strength characteristics compared to some metals, in an example embodiment using plastic to manufacture the screed hook apparatus 102, a rib 214 may be added to provide additional structural integrity under strong forces during use.

Additionally, and/or alternatively, the hook may be strengthened by a solid backing member (not shown) as wide as the width of the hook, like a single, wide rib. A rib may be as thin or as thick as needed to increase rigidity and durability of the screed hook apparatus.

Further, FIG. 2 depicts a sight window 216 as a through hole into the wall of a lower portion of collar 204. In some instances, one or more sight windows may be incorporated. See, for example, a second sight window on a back side of the screed hook apparatus in the cross-sectional view of FIG. 3. One or more sight windows, such as sight window 216, may allow a user to view the grade mark on a stake or rebar to adjust the height of the screed hook apparatus prior to engaging the set screw onto the stake or rebar. While the shape of sight window 216 may be any shape desirable, a shape having at least one vertex may be used, where the at least one vertex functions as an indicator. Specifically, when a shape with a vertex is used, sight window 216 may be oriented such that a position of the vertex points toward the lateral portion 208 of the hook 206 to indicate that the base of a rail (when placed in the hook) will rest at that height. For example, in side view 202, sight window 216, as depicted, is generally shaped as a triangle, where one of the three vertices is pointing to lateral portion 208. As explained above, for convenience, a sight window may be placed on each side of collar 204, thereby enabling a user to evaluate the position of the screed hook apparatus with respect to the stake or rebar from either side of the collar 204 quickly and easily.

Moreover, in some embodiments, where, for example, the collar is the same or approximately the same height as the lateral portion of the hook, as discussed above, the sight window may still be implemented on the sidewall of the collar between the lateral portion of the hook and the entry point of the set screw on the collar.

With respect to the handle 106, FIGS. 1 and 2 show a series of concave and convex structural features 218 on the external surface of handle 106. Structural features 218 may be included to facilitate gripping and rotating the handle 106 regardless of whether the user is wearing work gloves. Structural features 218 may include indentations, grooves, notches, divots, ribs, ridges, protrusions, etc. Alternatively, in some instances, the handle may have a smooth external surface (not shown), and/or be formed in an ergonomic shape conducive to grasping by a human hand. Further, handle 106 may be formed from a material having a property of a high surface frictional resistance force, so as to minimize slipping between a user's hand or gloved hand upon rotation, and thereby maintain maximum torque.

Figure 3:
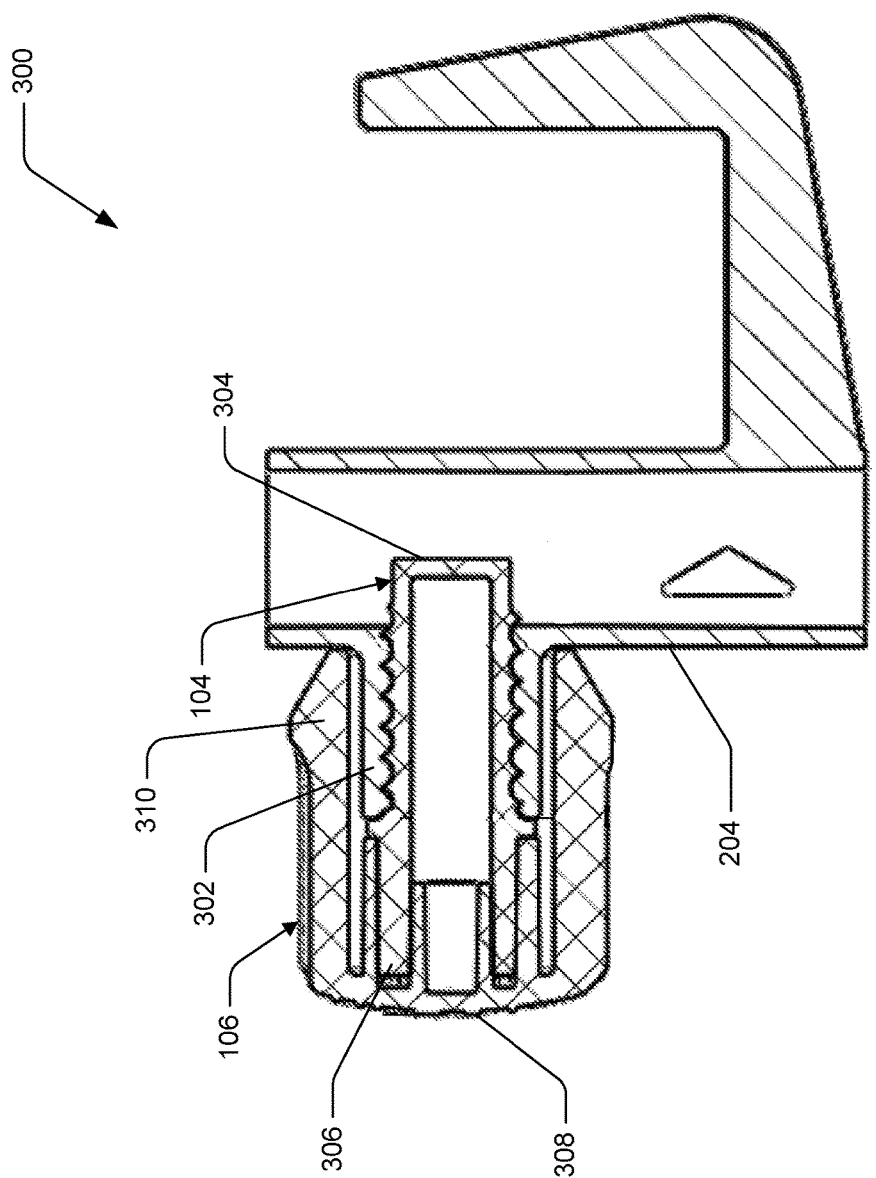
FIG. 3 illustrates a cross-sectional side view of the screed hook apparatus according to an embodiment of the instant application.

Depicted in FIG. 3 is a side cross-sectional view 300 of the side view 202 in FIG. 2. Retaining member 302 is tubular and may include a threaded portion to engage corresponding threads on set screw 104. A length of retainer member 302 may be at least half of a length of the threaded portion of the set screw to increase surface contact friction, thereby improving performance of the set screw in the screed hook apparatus. In further regards to length, set screw 104 may be of such a length that free end 304 of set screw 104 extends into collar 204 to engage a stake or rebar of various sizes (not shown). Note, in some instances, length of retainer member 302 may be less than half of the length of the threaded portion of the set screw. For example, in an embodiment (not shown), the length of the retainer member may be approximately as long as the thickness of the wall of the collar.

Moreover, as depicted, handle end 306 of set screw 104 may be attached to closed end 308 of handle 106. Thus, an internal dimension of the cavity in handle 106 may be greater than the external dimension of retaining member 302. In some instances, the dimension of the cross section of the external perimeter of the handle 106 may be selected so as to be sized for manipulation by a user's hand between the fingers and palm. With the handle sized as described above, a user may be able to rotate and tighten the set screw against a stake or rebar with greater force and ease compared to having to use a tool or rotate a small set screw between the fingertips and the thumb.

Further, sidewall(s) 310 of handle 106 may extend to such a length to cover the retaining member 302 and may further contact collar 204 as a limit to the depth of penetration into the collar 204 by free end 304 of set screw 104.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A screed hook apparatus, comprising:
   a tubular collar having an opening through a sidewall thereof, the collar being open on each end thereof;
   a tubular retainer member aligned with the opening on the collar and extending away from an outer surface of the collar, the retainer member having a threaded internal wall surface;
   an arm forming a hook shape, the arm having a first portion extending away from the collar and a second portion extending transverse to a direction of extension of the first portion such that a surface of the second portion of the arm faces the sidewall of the collar;
   a set screw having a threaded portion to engage the threaded internal wall surface of the retainer member, the set screw being configured to clamp against an object in the collar when the object extends within the collar; and
   a handle attached to the set screw,
   wherein the second portion extends in alignment with a direction of extension of the collar, and the hook shape of the arm is unobstructed in the direction of extension of the collar, such that a rail for screeding is insertable into the arm, when in use, in the direction of the extension of the collar.

2. The screed hook apparatus according to claim 1, further comprising at least one sight window aperture through the sidewall of the collar.

3. The screed hook apparatus according to claim 2, wherein the at least one sight window aperture is aligned with the first portion of the arm.

4. The screed hook apparatus according to claim 1, wherein the collar is elongated along an axis, and the arm extends from a first axial position and the retainer member extends from a second axial position distinct from the first axial position.

5. The screed hook apparatus according to claim 1, wherein the handle includes a cavity formed by a sidewall and a closed end opposite an open end, and
   wherein the set screw attaches to an inner surface of the closed end of the handle.

6. The screed hook apparatus according to claim 5, wherein a minimum dimension across the cavity inside the handle is greater than a maximum dimension across an external surface of the tubular retainer member, such that the handle covers the tubular retainer member when the set screw engages the tubular retainer member.

7. The screed hook apparatus according to claim 1, further comprising at least one support rib extending along a surface of the arm.

8. The screed hook apparatus according to claim 1, wherein a length of the tubular retainer member is at least half of a length of the threaded portion of the set screw.

9. An apparatus, comprising:
   a hook member having a rail rest area and a rail side brace portion;
   a collar connected to the hook member, the collar being tubular and open on each end thereof;
   a set screw to engage a hole in the collar, the set screw being configured to clamp against an object in the collar when the object extends within the collar; and
   a sight window aperture in a side of the collar,
   wherein the hook member extends in alignment with a direction of extension of the collar, and the hook member is unobstructed in the direction of extension of the collar, such that a rail for screeding is insertable into the hook member, when in use, in the direction of the extension of the collar.

10. The apparatus according to claim 9, wherein a material of the hook member, the collar, and the set screw is plastic.

11. The apparatus according to claim 9, wherein the collar is a cylinder.

12. The apparatus according to claim 9, further comprising a retainer member aligned with and attached to the hole in the collar,
    wherein the set screw engages the hole in the collar via a threaded engagement in the retainer member.

13. The apparatus according to claim 9, wherein a perimeter of the sight window aperture is shaped with a shape having at least one vertex, and
    wherein the shape of the aperture is oriented in the collar such that the at least one vertex points to the rail rest area of the hook member.

14. The apparatus according to claim 9, wherein a direction of extension of the set screw when engaged in the hole in the collar is directly opposite a direction of extension of the hook member extending from the collar.

15. The apparatus according to claim 9, further comprising a handle attached to the set screw, the handle being sized to accommodate gripping for manual rotational movement between fingers and a palm of a hand.

16. The apparatus according to claim 15, wherein the set screw attaches to an interior surface of the handle such that a wall of the handle conceals the set screw at least partially.

17. A screed hook, comprising:
    a tubular collar that is open on each end thereof;
    a retainer member that extends from a first side of the collar;
    a hook member extending from a second side of the collar opposite the first side; and
    a handle that at least partially conceals an attached set screw within the handle, the set screw configured to connect to the collar within the retainer member and to clamp against an object in the collar when the object extends within the collar, and the handle being sized for manual rotational manipulation via a grip between a palm and fingers of a hand, wherein the hook member extends in alignment with a direction of extension of the tubular collar, and the hook member is unobstructed in the direction of extension of the tubular collar, such that a rail for screeding is insertable into the hook member, when in use, in the direction of the extension of the tubular collar.

18. The screed hook according to claim 17, wherein the collar includes an aperture through a sidewall thereof, the aperture being aligned with the hook member.

19. The screed hook according to claim 17, wherein the collar extends approximately in parallel with a portion of the hook member.

* * * * *